June 27, 1950  H. N. FAIRBANKS  2,513,084
FILM SPROCKET CLAMP
Filed March 9, 1946

INVENTOR
HENRY N. FAIRBANKS
BY
*Baldwin & Castlebury*
ATTORNEYS

Patented June 27, 1950

2,513,084

UNITED STATES PATENT OFFICE 2,513,084

FILM SPROCKET CLAMP

Henry N. Fairbanks, Beverly Hills, Calif., assignor to Mitchell Camera Corporation, West Hollywood, Calif., a corporation of Delaware Application March 9, 1946, Serial No. 653,408

11 Claims. (Cl. 271—2.3)

This invention has to do with an improved film handling sprocket for use in motion picture equipment and the like. The primary objects of the invention are to facilitate threading the film between the sprocket and the guide rollers by simplifying the manual operations which are required; and to reduce the space necessary for the entire sprocket assembly by greatly reducing the relative motion of the parts when the film is to be released from or admitted to engagement with the sprocket. An important characteristic of a film sprocket designed according to my invention in its preferred form is that when the sprocket is in the open or film releasing position the main body of the sprocket itself and the entire structure of the film clamping rollers retain their normal operating positions. Only the sprocket head and the associated sprocket disk which carries the film engaging teeth need be moved, and even the motion of these parts is relatively slight.

A full understanding of these and other features of my invention will be made clear by description of a preferred and illustrative embodiment, for which reference is made to the accompanying drawings.

Figure 1:
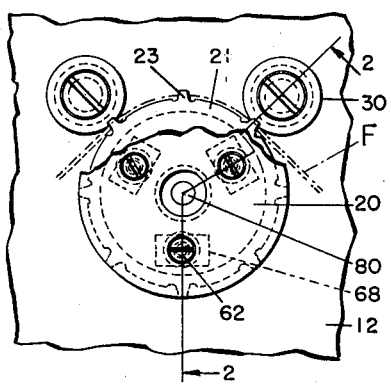
Fig. 1 is a partially cut away end view of the sprocket assembly in its normal operating position.

In the figures the sprocket shaft is shown at 10, and is journalled in the bearing 11 which is mounted in a rigid part of the frame 12 of the machine illustrated as a flat plate. The sprocket itself comprises the body 20 which is rigidly mounted on shaft 10, and sprocket disk 21 and sprocket head 22 which are connected to body 20 by means to be described. The film guiding or confining means may be of any suitable form. That means is here illustrated as rollers 30 which rotate freely on their shafts 31, rigidly attached to frame 12 by the threaded portions shown at 32, and are retained upon their shafts by screws 33. These rollers 30 carry film engaging surfaces 41, 43 and 45 which cooperate respectively with the surface 42 on sprocket head 22, and surfaces 44 and 46 on sprocket body 20 to restrain the film F in a radial direction and to insure engagement of the sprocket teeth 23 with perforations 24 of the film. To avoid injury to the centrally located picture area of the film the surface of the rollers is relieved at 47 and the sprocket hub is relieved at 48. The rollers are similarly relieved at 49 and the sprocket hub at 50 to avoid contact with the sound track area of the film near its inner edge. The sprocket teeth 23, which project through apertures 24 in the film, are accommodated by the groove 51 located between surfaces 41 and 43 of guide rollers 30. The lateral position of film F is normally determined by its engagement with the sprocket teeth; in absence of such engagement it is restricted by the inner flange 54 on sprocket body 20 and by outer flange 55 on sprocket head 22.

To permit insertion or removal of the film according to my invention, the toothed sprocket disk 21 and the sprocket head 22 are connected to sprocket body 20 in such a way that they are coaxial with sprocket shaft 10 during normal operation but may be moved transversely of the axis into such a position that sprocket teeth 23 no longer engage the film perforations and that outer flange 55 no longer restricts the outward lateral displacement of the film. Under these conditions, as is clear from Fig. 3, the film may be freely withdrawn from or inserted between the sprocket body and the guide rollers. The distance through which the head and sprocket disk drop is sufficient not only to move the uppermost sprocket tooth below the periphery of surface 44 of the sprocket body, but also to move the two adjacent sprocket teeth down far enough to at least not project beyond that surface and preferably to be slightly radially inside of it. With the sprocket teeth in that position, and with head flange 55 having a diameter at least equal to the maximum tooth diameter, the film is prevented from contacting the sprocket teeth during insertion and removal.

Figure 5:
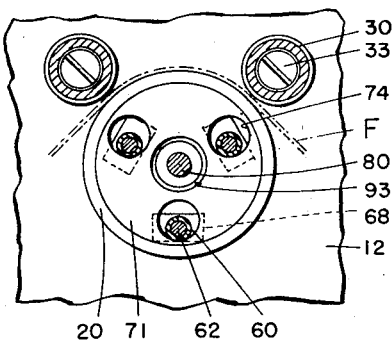
Fig. 5 is a transverse section on line 5—5 of Fig. 3.

In the preferred embodiment illustrated, sprocket head 22 and disk 21 are connected to sprocket body 20 by means of studs 60. These are rigidly mounted in the holes 61 in the inner face of sprocket head 22 by screws 62. The flanges 65 on studs 60 seat against the inner face of the sprocket head and are accommodated by the holes 66 in sprocket disk 21. Sprocket hub 20 is recessed at 70 and the disk 71 is pressed tightly into the recess, leaving a space 72 between the inner surface of the disk and the bottom surface 73 of recess 70. Studs 60 extend through the holes 74 in disk 71, which are considerably larger than the diameter of studs 60 and are so placed as to be coaxial with the studs when the parts of the sprocket assembly are in their normal coaxial operating relation. The heads 68 of studs 60 are of oblong shape, as shown in Fig. 5, their longer dimension being oriented tangentially, and they slidingly engage the inner surface of disk 71, thus retaining head 22 and disk 21 in sliding contact with the outer face of sprocket body 20. Due to the relatively small diameter of stud heads 68 in a radial direction, they are free to move within the recess 72 in a plane at right angles to the sprocket axis as freely as is permitted by the clearance between studs 60 and holes 74 in disk 71.

The transverse sliding motion of sprocket disk 21 and head 22 relative to sprocket body 20 is controlled by plunger 80. The main body 81 of this plunger is cylindrical and fits slidingly in the axial hole 82 in sprocket body 20 and in the coaxial hole 83 in disk 71. Plunger 81 is urged outwardly in hole 82 by the coil spring 85. In normal operating position its outward motion is limited by contact of its shoulder 90 with the inner face of sprocket disk 21. Outward of shoulder 90 is a cylindrical portion 91 which fits accurately in the central holes 93 in sprocket head 22 and disk 21. The outer portion 95 of plunger 80 is of relatively small diameter, and extends well outside sprocket head 22. The two cylindrical sections 91 and 95 of plunger 80 are joined by the generally conical section 92.

Figure 2:
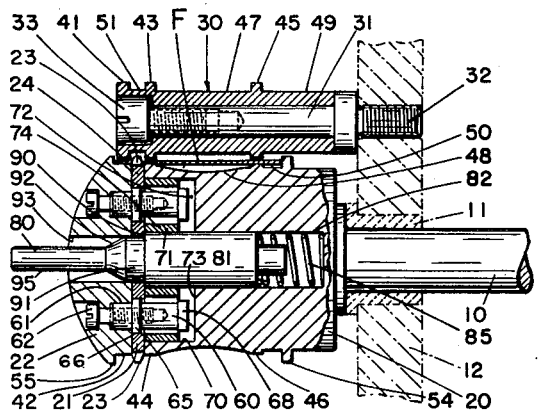
Fig. 2 is a longitudinal section on line 2—2 of Fig. 1, showing the parts in their normal operating positions.

When the sprocket is in normal operation, plunger 80 assumes its extreme outward position, shown in Fig. 2, its cylindrical section 91 restraining the transverse sliding motion of sprocket disk 21 and head 22, so that these parts are in effect rigidly joined to sprocket body 20. The plunger centers the several parts co-axially, and the studs connect the parts to rotate together. If now plunger 80 is pressed in to the position shown in Fig. 3, compressing spring 85, the sliding motion of sprocket disk 21 and head 22 is no longer restrained, and they drop by gravity into the position shown in Figs. 3 and 4. In practice this motion is limited either by contact of the wall of hole 93 with the cylindrical section 95 of the plunger, or by contact of studs 60 with the walls of holes 74 in disk 71, or in both ways, depending upon the dimensions of the parts. If that displacement is limited by the studs, and not limited by the pin in such manner that the displacements of both head and disk are equal; then the stud flanges can, by fitting the disk holes loosely, allow a greater displacement of the disk than of the head. With the sprocket in this dropped position the film can readily be inserted or withdrawn, as pointed out above. Upon release of plunger 80 it is again forced outward by spring 85, the conical section 92 of the plunger acting as a wedge and lifting the sprocket disk 21 and head 22 back into their operating positions (Fig. 2), where they are effectively locked as before, by cylindrical portion 91 of the plunger. In the drawings this cylindrical portion is shown to be long enough to project through sprocket disc 21 and engage hole 93 in sprocket head 22. Thus it effectively defines the axes of both these members, making it unnecessary for the flanges 65 on studs 60 to fit accurately holes 66 in the sprocket disk. On the other hand, if flanges 65 do fit holes 66 closely, this prevents relative transverse motion of sprocket disk 21 and head 22, and it becomes sufficient for cylindrical section 91 of the plunger to engage only sprocket disk 21. In general, the sprocket disk and the head may be regarded as if they were integral. Except that it is desirable to make the head and sprocket disk of different materials, the head may be nothing more than an annular integral extension of the disk to provide the annular surface 42 and the protective shoulder 55 for the edge of the film.

Figure 6:
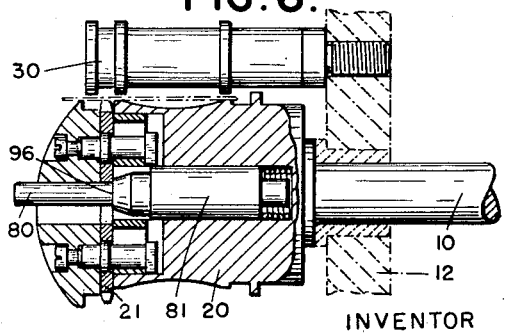
Fig. 6 is a longitudinal section, similar to Fig. 3, but showing a modification of the design by which the sprocket may be temporarily locked in its open position.

The generally conical portion 92 of plunger 80 may be shaped in various ways. In Fig. 6 is shown a modification in which this conical surface terminates at its outer end in a slight shoulder 96. This has the effect, after the plunger has been pressed in and the sprocket disk and head have dropped to their open position as shown in the figure, of preventing the plunger from moving outward. The sprocket is thus temporarily locked in its open position, facilitating the operation of threading. A slight upward pressure on sprocket head 22 is then sufficient to disengage shoulder 96 from the inner corner of sprocket disk 21, and the sprocket is then returned automatically to its operating position, as described before. Or a slight rotation of the sprocket, either by hand or by starting the mechanism in operation, will cause the sprocket and head to move to or toward their centralized position, allowing the plunger to move out to lock them in that position. When, in rotation, the relatively protruding part of head surface 42 approaches a roller flange 41, the flange presses inwardly on the film and thus on the head to move it and the sprocket toward centralized position. And this same initial rotation may also engage the sprocket teeth in the film perforations if they have not previously been so engaged.

Figure 4:
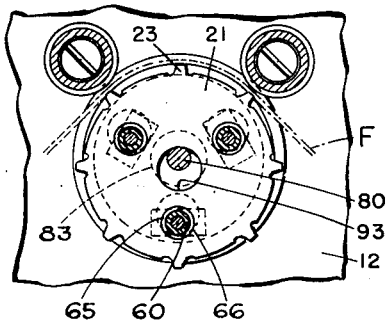
Fig. 4 is a transverse section on line 4—4 of Fig. 3.
Figure 3:
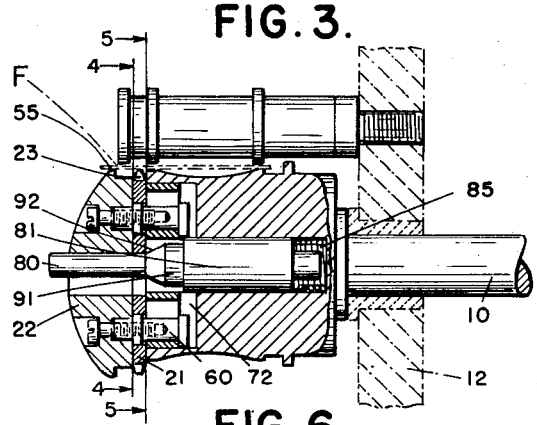
Fig. 3 is a similar section showing the sprocket in its film releasing or open position.

A comparison of Figs. 1 and 4 or of Figs. 2 and 3 will show the very slight motion which is necessary to change the sprocket assembly from its operating position to its open position. This permits other apparatus to be placed in the immediate neighborhood of the sprocket without interfering with its operation. The length of the sprocket body, as shown in the drawings, is greater than is necessary. In fact it will be apparent from the drawings that the entire extension of sprocket body 20 inward of flange 54 can readily be eliminated, guide rollers 30 being altered accordingly, and the inner edge of the film thus brought as close to the face of frame 12 as operating requirements permit. As has been indicated, the preferred form of the invention is one in which the shiftable part of the sprocket (essentially the sprocket disk 21) is relatively small—that is, in the form of a relatively thin disk. However, the invention is applicable to a thicker disk and even to one which may be so thick as to provide or include the major portion of what is here described as the body 20 of the sprocket. This can be readily visualized from Fig. 2 simply by assuming that sprocket disk 21 be increased in thickness by an extended cylindric portion to the right of the sprocket teeth, the sprocket body 20 being commensurately shortened axially, and studs 60 being increased in length so as to accommodate the thickened sprocket disk. In such an instance the body 20 becomes mainly or solely (just as it is primarily in the preferred design) a mount or carrier for the shiftable member which carries the sprocket teeth. The term "body" as used in the following claims is to be understood in such sense.

I claim:

1. In film drive devices which include a sprocket unit mounted for rotation about its axis, and a film confining element mounted to overlie a portion of the periphery of the sprocket unit and to confine a film against the sprocket unit; a sprocket unit comprising a body, a circular toothed sprocket member, means mounting the sprocket member on the body to be movable between a position concentric with the body and a position eccentric therewith, and releasable means separate from the mounting means for holding the sprocket member in its concentric position.

2. In film drive devices which include a sprocket unit mounted for rotation about its axis, and a film confining element mounted to overlie a portion of the periphery of the sprocket unit and to confine a film against the sprocket unit; a sprocket unit comprising a body of general cylindric form having an end face which is perpendicular to the body axis, a sprocket disk, means for confining the disk against the end face of the body and allowing sliding movement of the disk between a position concentric with the body and a position eccentric therewith, and releasable means separate from the confining means for holding the sprocket disk in its concentric position.

3. A sprocket unit comprising a body of general cylindric form mounted for rotation about its axis, a circular toothed sprocket member, means mounting the sprocket member on the body to be movable between a position concentric with the body and a position eccentric therewith, and releasable means separate from the mounting means for holding the sprocket member in its concentric position.

4. A sprocket unit comprising a body of general cylindric form mounted for rotation about its axis and having an end face normal to its axis, a sprocket disk, means for confining the disk against the end face of the body and allowing sliding movement of the disk between positions concentric and eccentric with the body, and releasable means separate from the confining means for holding the disk in its concentric position.

5. A sprocket unit as defined in claim 4 and in which the disk confining means comprises a circular head lying against the outer face of the disk, and studs which connect both the head and the disk to the body.

6. A sprocket unit as defined in claim 4 and in which the disk confining means comprises a circular head lying against the outer face of the disk, and studs which connect both the head and the disk to the body, the studs being rigidly attached to the head, passing through the disk and connected to the body to have play therein in a direction parallel to the plane of the disk.

7. A sprocket unit as defined in claim 4, and in which the disk centering means comprises an axially movable pin mounted axially in the body and having an outer part of relatively small diameter projecting outwardly through an axial bore in the sprocket disk, the pin having an intermediate outwardly tapering, formation of general conical form adapted to enter the central bore in the sprocket disk by outward movement of the pin, and a spring tending to move the pin outwardly.

8. A sprocket unit as defined in claim 4, and in which the disk centering means comprises an axially movable pin mounted axially in the body and having an outer part of relatively small diameter projecting outwardly through an axial bore in the sprocket disk, the pin having an intermediate outwardly tapering, formation of general conical form adapted to enter the central bore in the sprocket disk by outward movement of the pin, a cylindric formation at the base of the conical formation adapted to fit the central bore in the sprocket disk and a shoulder at the inner end of the cylindric formation adapted to bear outwardly against the inner face of the disk, and a spring tending to move the pin outwardly.

9. A sprocket unit as defined in claim 4, and in which the disk centering means comprises an axially movable pin mounted axially in the body and having an outer part of relatively small diameter projecting outwardly through an axial bore in the sprocket disk, the pin having an intermediate outwardly tapering, formation of general conical form adapted to enter the central bore in the sprocket disk by outward movement of the pin, an annular shoulder formation at the outer end of the conical formation adapted to catch on the inner face of the disk at the edge formed by the central bore therein, and a spring tending to move the pin outwardly.

10. In film drive devices which include a sprocket unit mounted for rotation about its axis, and a film confining element mounted to overlie a portion of the periphery of the sprocket unit and to confine a film against the sprocket unit; a sprocket unit comprising a body, a circular toothed sprocket member, means mounting the sprocket member on the body to be movable between a position concentric with the body and a position eccentric therewith, the sprocket member having a central axial opening therethrough, and means for releasably holding the sprocket member in its concentric position comprising a tapered plunger mounted to slide centrally and axially of the sprocket body and through the opening in the sprocket member, said tapered plunger in one of its axial positions fitting said opening snugly.

11. In film drive devices which include a sprocket unit mounted for rotation about its axis, and a film confining element mounted to overlie a portion of the periphery of the sprocket unit and to confine a film against the sprocket unit; a sprocket unit comprising a body of general cylindric form having an end face which is perpendicular to the body axis, a sprocket disk, means for confining the disk against the end face of the body and allowing movement of the disk between a position concentric with the body and a position eccentric therewith, the sprocket member having a central axial opening therethrough, and means for releasably holding the sprocket disk in its concentric position comprising a tapered plunger mounted to slide centrally and axially of the sprocket body and through the opening in the sprocket disk, said tapered plunger in one of its axial positions fitting said opening snugly.

HENRY N. FAIRBANKS.

REFERENCES CITED

The following references are of record in the file of this patent:

UNITED STATES PATENTS

| Number | Name | Date |
| --- | --- | --- |
| 927,942 | Buswell et al. | July 13, 1909 |
| 1,348,183 | Rayfield | Aug. 3, 1920 |